(12) United States Patent
Cadima et al.

(10) Patent No.: US 8,683,272 B2
(45) Date of Patent: Mar. 25, 2014

(54) BACKGROUND MEMORY VALIDATION FOR GAMING DEVICES

(71) Applicant: Bally Gaming, Inc., Las Vegas, NV (US)

(72) Inventors: Ronald A. Cadima, Las Vegas, NV (US); Anand Singh, Henderson, NV (US); James Schaefer, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 13/779,479

(22) Filed: Feb. 27, 2013

(65) Prior Publication Data

US 2013/0179738 A1 Jul. 11, 2013

Related U.S. Application Data

(63) Continuation of application No. 12/617,460, filed on Nov. 12, 2009, now Pat. No. 8,429,464.

(51) Int. Cl.
*G06F 11/00* (2006.01)

(52) U.S. Cl.
USPC .............................................. 714/54

(58) Field of Classification Search
USPC ........................................ 714/48, 54
See application file for complete search history.

(56) References Cited

U.S. PATENT DOCUMENTS

| | | | |
|---|---|---|---|
| 5,632,012 A * | 5/1997 | Belsan et al. | 714/6.12 |
| 7,246,269 B1 | 7/2007 | Hamilton | |
| 2008/0064501 A1 | 3/2008 | Patel | |
| 2009/0070647 A1 | 3/2009 | Allison et al. | |
| 2009/0237221 A1 | 9/2009 | Battles et al. | |
| 2009/0280907 A1* | 11/2009 | Larsen et al. | 463/42 |
| 2010/0042629 A1 | 2/2010 | Fukatani et al. | |
| 2010/0130287 A1* | 5/2010 | Dasgupta | 463/44 |

* cited by examiner

*Primary Examiner* — Yair Leibovich
(74) *Attorney, Agent, or Firm* — Brooke Quist; Marvin Hein

(57) ABSTRACT

Various embodiments are directed to a gaming device including a background memory validation system. The background memory validation system includes a background kernel thread that validates read-only pages on the gaming device. Additionally, the background kernel thread also minimizes potential timing problems because this process only validates page content in memory that is fully-loaded and functional.

17 Claims, 8 Drawing Sheets

BACKGROUND MEMORY VALIDATION FOR GAMING DEVICES

CROSS-REFERENCE TO RELATED APPLICATION

This application is a continuation of U.S. patent application Ser. No. 12/617,460 filed Nov. 12, 2009, which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

This disclosure relates to validation systems, and more particularly, to memory validation systems.

BACKGROUND

Over the years, gaming machines have grown in both sophistication and gaming features to maintain player interest. Gaming machines have gone from relatively simple devices providing a player with an opportunity to win cash awards to sophisticated, multi-media devices. Even more, the games presented on the gaming machines have become increasingly complex with games having one or more bonus games or different game modes that allow a player to participate in a community game or a tournament. While the gaming machines and games have become increasingly complex, gaming devices have become easier to change, modify, or expand feature sets by downloading new software packages. However, the security of the gaming devices needs to be maintained. As a result, various authentication and validation methods have been developed to maintain the integrity and security of the gaming devices. Nevertheless, there is a continuing need for authentication and validation techniques for gaming devices.

SUMMARY

Briefly, and in general terms, various methods for validating pages as a background process are disclose herein. According to one method, verifying contents of one or more pages stored within the memory of a gaming device includes: installing a memory validation module on a basic input output system in the gaming device; receiving a command from the memory validation module to start a background validation kernel thread; validating the contents of one or more read-only pages stored within a memory of the gaming device with the background validation kernel thread, wherein validating the contents of the read-only pages is a background process; and presenting a system fault on a display of the gaming device when a read-only page is not validated.

Alternatively, the pages stored in a memory of a gaming device are verified by initiating a memory validation for one or more pages stored within the memory of the gaming device, wherein the memory validation is a background process; configuring a processing loop for the memory validation; determining whether a page is a read-only page; validating the read-only page; and presenting a system fault on a display of the gaming device when a read-only page is not validated.

Another method for verifying the contents of one or more pages stored on a gaming device includes: initiating a memory validation for one or more pages stored within the memory of the gaming device, wherein the memory validation is a background process; determining whether a page is active by analyzing page table entry and the virtual memory address of the page; determining whether the active page is a read-only page; validating the active, read-only page; and presenting a system fault on a display of the gaming device when an active, read-only page is not validated.

Other features and advantages will become apparent from the following detailed description, taken in conjunction with the accompanying drawings, which illustrate by way of example, the features of the various embodiments.

DETAILED DESCRIPTION

Various embodiments are directed to a gaming device including a background memory validation system. The background memory validation system includes a background kernel thread that validates read-only pages on the gaming device. Additionally, the background kernel thread also minimizes potential timing problems because this process only validates page content in memory that is fully-loaded and functional.

Figure 1:
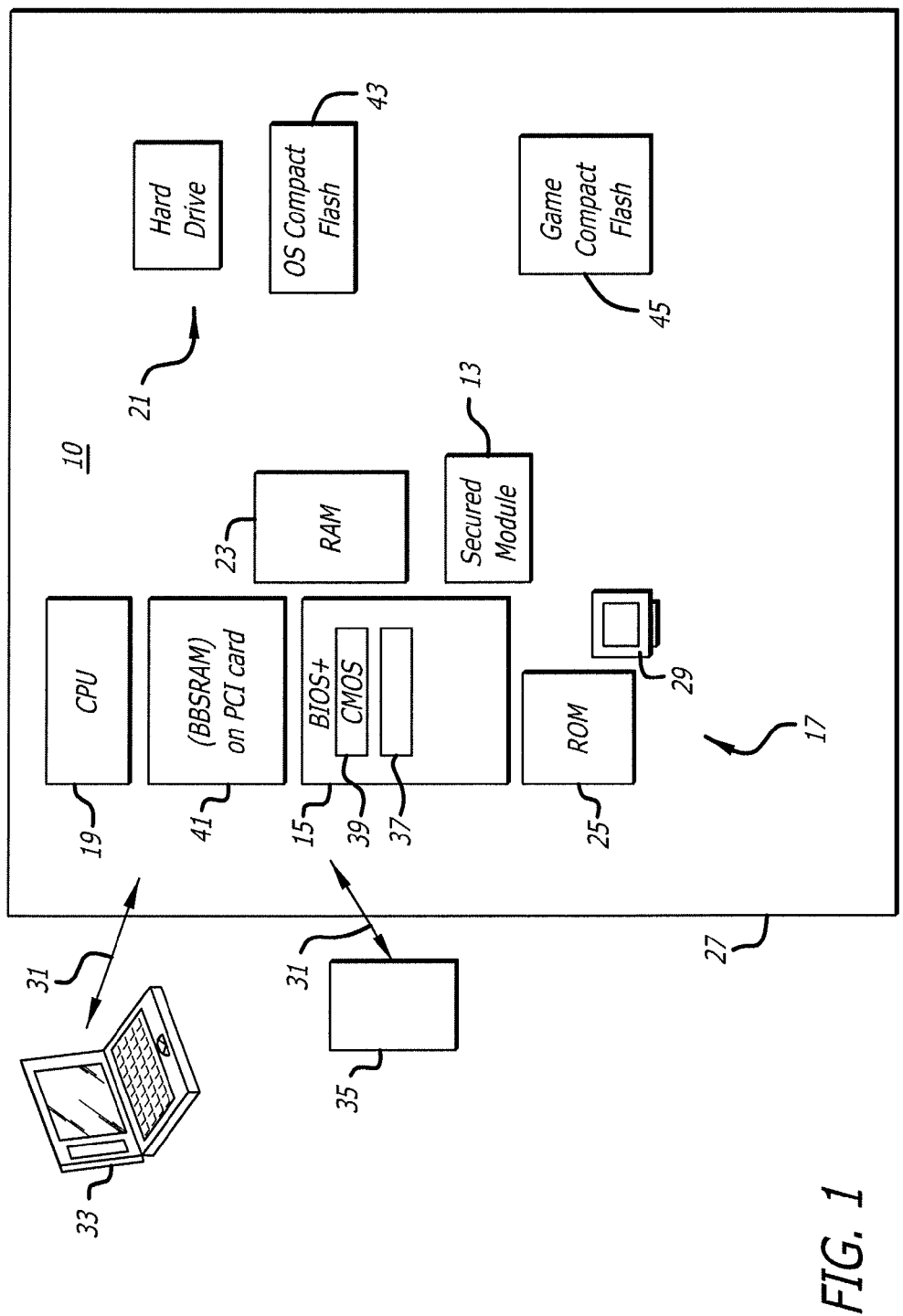
FIG. 1 illustrates a block diagram of the components of a gaming device.

FIG. 1 illustrates a block diagram of the components 17 of a gaming device 10. The components 17 comprise, for example, and not by way of limitation, software or data file components, firmware components, hardware components, or structural components of the gaming machine 10. These components include, without limitation, one or more processors 19, a hard disk device 21, volatile storage media such as random access memories (RAMs) 23, read-only memories (ROMs) 25 or electrically-erasable, programmable ROMs (EEPROMS) such as basic input/output systems (BIOS) 15. Additionally, the gaming device 10 includes a secured module 13. The secured module is a hardware component that is one-time programmable. One or more security algorithms may be provided on the secured module. The security algorithm generates a challenge (e.g., generates a random number), calculates an expected response to the challenge, and determines the validity of the BIOS based on the response to the challenge provided by the BIOS. In one embodiment, the secured module is a field-programmable gate array (FPGA). In another embodiment, the secured module is a trusted platform module (TPM).

In one embodiment, components 17 also include data files (which are any collections of data, including executable programs in binary or script form, and the information those programs operate upon), gaming machine cabinets (housings) 27, displays 29, or compact disk read-only memory (CDROM) or CD read-write (CR-RW) storage. In one embodiment, the data files may include data storage files, software program files, operating system files, and file allocation tables or structures. Ports 31 are included with the gaming machine 10 for connection to diagnostic systems 33 and other input/output devices 35. In one embodiment, the ports 31 each comprise a serial port, universal serial bus (USB) port, parallel port or any other type of known port, including a wireless port. Preferably, each of the components 17 have embedded or loaded in them identification numbers or strings that can be accessed by the processor 19, including the processor 19 itself, which are utilized for authentication as explained below. In one embodiment, the components that are data files each using their file path and name as their identification number or string.

Either within the gaming machine 10, or in the diagnostic system 33 attachable to the gaming machine 10, are executable instructions or a software program 37 for authentication of the components (authentication software 37), which itself may be one of the components 17 to authenticate if it is internal to the gaming machine 10. In one embodiment, authentication software 37 is stored on a persistent storage media such as the hard disk device 21, ROM 25, EEPROM, in a complementary metal oxide semiconductor memory (CMOS) 39, in safe RAM comprising a battery-backed static random access memory (BBSRAM) 41, in flash memory components 43, 45, or other type of persistent memory. In one embodiment, the authentication software 37 is stored in a basic input/output system (BIOS) 15 device or chip. BIOS chips 15 have been used for storing prior authentication software, such as previous versions of the BIOS+ chip used by Bally Gaming Systems, Inc. of Las Vegas, Nev. in their EVO gaming system. Placing the authentication software 37 in the BIOS 15 is advantageous because the code in the BIOS 15 is usually the first code executed upon boot or start-up of the gaming machine 10, making it hard to bypass the authentication process. Alternatively, in one embodiment, the authentication software 37 is stored in a firmware hub (FWH), such as Intel's 82802 FWH.

As an alternative, instead of, or in conjunction with, the hard disk device 21, another mass storage device is used, such as a CD-ROM, CD-RW device, a WORM device, a floppy disk device, a removable type of hard disk device, a ZIP disk device, a JAZZ disk device, a DVD device, a removable flash memory device, or a hard card type of hard disk device.

It should be noted that the term, gaming device, is intended to encompass any type of gaming machine, including handheld devices used as gaming machines such as cellular based devices (e.g., phones), PDAs, or the like. The gaming device can be represented by any network node that can implement a game and is not limited to cabinet-based machines. The system has equal applicability to gaming machines implemented as part of video gaming consoles, handheld, or other portable devices. In one embodiment, a geo-location device in the handheld or portable gaming device may be used to locate a specific player for regulatory and other purposes. Geo-location techniques that can be used include by way of example, and not by way of limitation, an IP address lookup, a GPS, a cell phone tower location, a cell ID, a known Wireless Access Point location, a Wi-Fi connection used, a phone number, a physical wire or port on a client device, or by a middle tier or a backend-accessed server. In one embodiment, GPS and biometric devices are built within a player's client device, which in one embodiment, comprises a player's own personal computing device, or is provided by the casino as an add-on device using USB, Bluetooth, IRDA, serial or another interface to the hardware to enable jurisdictionally compliant gaming, ensuring the location of play and the identity of the player. In another embodiment, the casino provides an entire personal computing device with these devices built in, such as a tablet-type computing device, a PDA, a cell phone or another type of computing device capable of playing system games.

Figure 2:
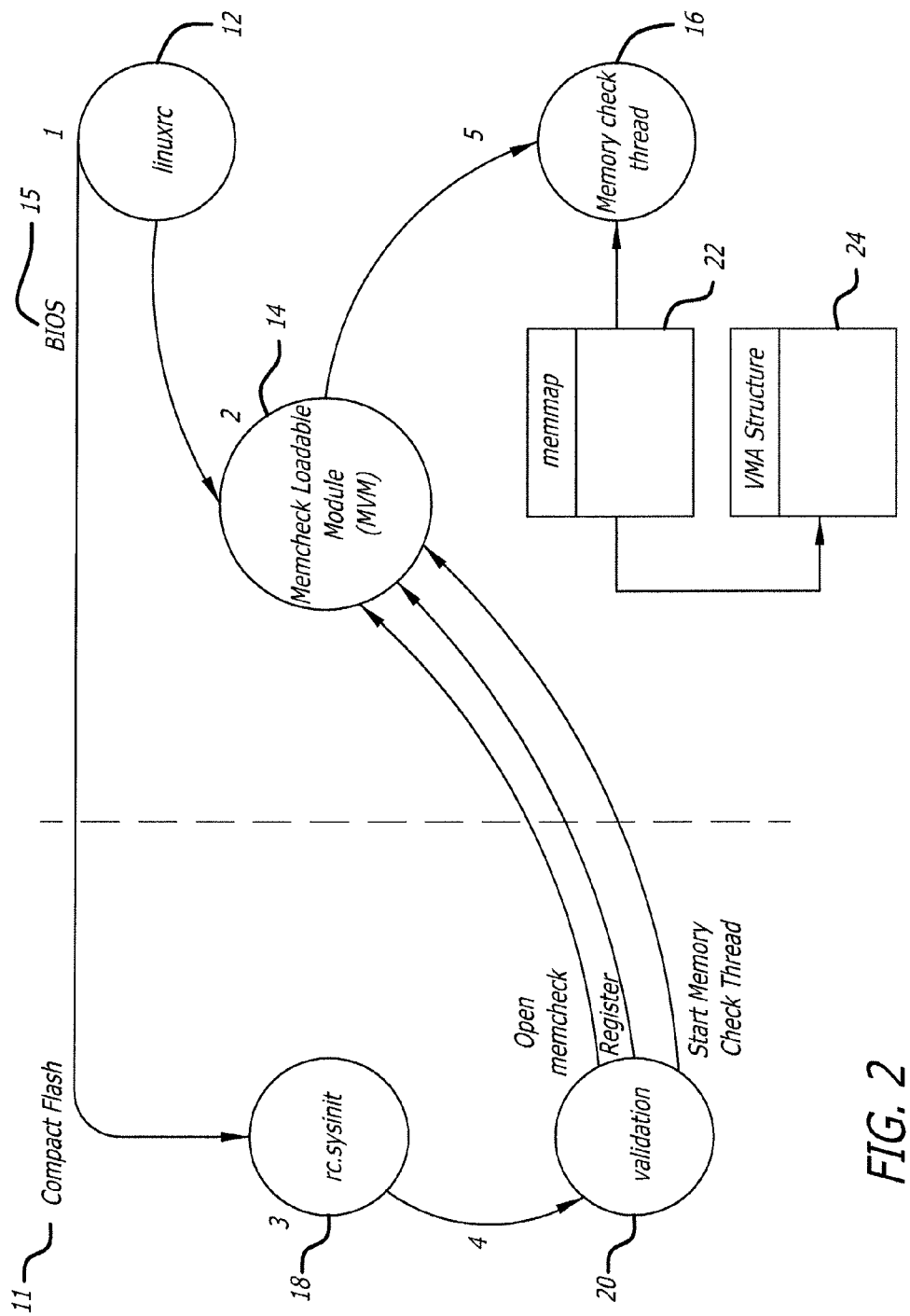
FIG. 2 is a block diagram illustrating the components of one embodiment of a background memory validation system.

Referring now to the drawings, wherein like reference numerals denote like or corresponding parts throughout the drawings and, more particularly to FIGS. 2-5, there are shown various embodiments of a background memory validation system. More specifically, FIG. 2 illustrates the various components used in the background memory validation system. As shown in FIG. 2, the linuxrc control file 12, memory validation module (MVM) (or memcheck loadable module) 14, and memory check thread 16 are located in the initial RAM disk and stored on the BIOS EPROM 10. The rc.sysinit command file 18 and the validation process 20 are stored on the processing compact flash 11.

FIG. 2 also provides an overview of the logic flow for starting the background memory validation. At step 1, the linuxrc control file is loaded from the initial RAM and started during BIOS processing. The linuxrc control file also installs the memory validation module (MVM). At step , the MVM is loaded and performs initialization procedures. These procedures include, but are not limited to, creating various proc files that are used to identify the status of the memory validation as well as allowing the game manager to request a complete sweep of the memory be performed in response to a door close tilt. At step 3, control is passed from linuxrc control file processing to the rc.sysinit Linux start-up command file. The rc.sysinit command file loads and initializes the Linux operating environment. Additionally, the start-up command file also starts a validation process. At step 4, the validation process opens the MVM, registers with the MVM, and notifies the MVM that the validation process controls the functions for starting and stopping the background validation process. At step 5, the MVM starts a Memory Check Thread (MCT) as a kernel thread in which read-only pages are validated.

Generally, the background kernel uses page table entries and the virtual memory address (VMA) of the actual pages to determine which pages need to be validated. The page table entries include a plurality of filed, but not all fields are used by the MVM logic to validate a page. The following table includes some fields that may be used to validate a read-only page.

| Field Name | Description |
| --- | --- |
| Flags | Specific flags that identify state of the page and what it references. |
| _count | Specifies the page usage count. |
| _mapcount | If the PG_buddy flag is not set and this is not a reserved page, this contains the number of VMAs that are associated with this page. |
| Mapping | Pointer to file vma list or anonymous vma list associated with page. |

Within the flags field of the page table entries, the following table lists some of the flags of interest:

| Flag Name | Description |
|---|---|
| PG_buddy | Specifies page is free and is member of buddy list in memory slab. |
| PG_error | Indicates that an I/O error has occurred while accessing the page. |
| PG_private | Private data that has been allocated or is part of a loadable file. |
| PG_reserved | Page is reserved and can not be swapped out of memory. These are pages usually associated with Linux kernel and device drivers. |
| PG_locked | Page is pinned and should not be accessed. |
| PG_referenced | Page has been referenced. |
| PG_uptodate | Indicates contents of page up to date. When page loaded from disk, indicates IO for page completed successfully. If not set, page is in transition. |

In use, when the background kernel thread starts processing, the background kernel thread loops through the entries in the mem_map table 24. Each page is analyzed to determine whether the page is an anonymous page (e.g., a page associated with the kernel code, loadable modules, or allocated memory) or whether the page is mapped to one or more processes. Also, the pages are checked to insure that the pages are up-to-date, unlocked, or not in error.

If a VMA is found to be writable, the CRC32 value stored in the page table entry is zeroed. It is assumed that the CRC32 value of a read-only page will never be zero. The writable page is not validated by the background kernel.

If the page is valid, the VMAs associated with the page are accessed to determine whether the page is a read-only page. If the page is read-only, the page will be validated, and a CRC32 value of the page's content is then calculated. If the page's contents have not been previously digested, the CRC32 value is stored in a new field in the page table entry. Otherwise, the calculated CRC32 value is compared against a previously-stored CRC32 value to determine whether any changes have occurred. In other embodiments, other CRCs known and developed in the art may be used to check a page's content.

The memory validation kernel thread is only started after rc.sysinit processing has commenced because the timer support and full thread support are not completely initialized until that point. Otherwise, starting the thread at the time the memory check module is loaded can cause system traps and other problems.

Figure 3:
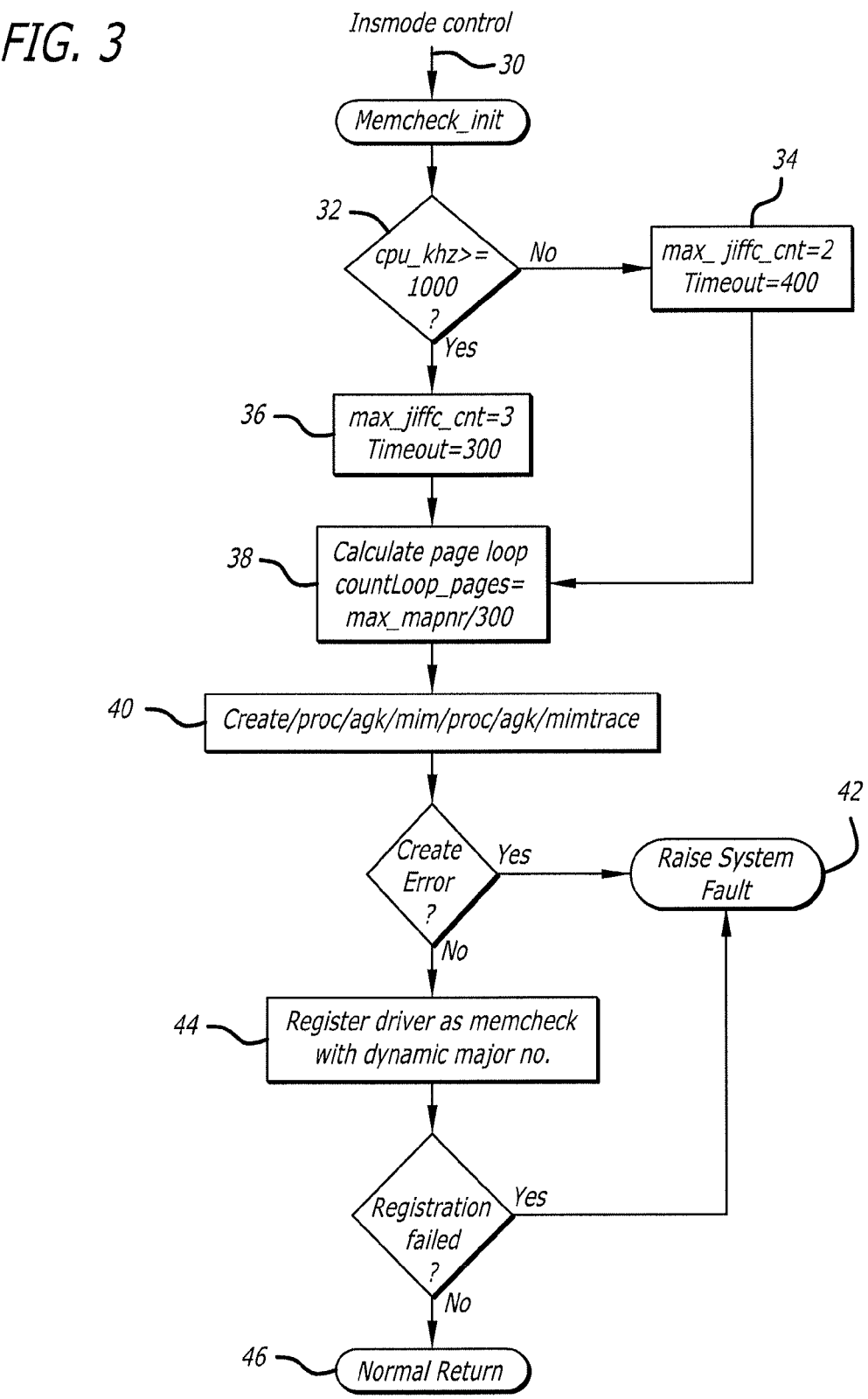
FIG. 3 is a flow diagram of one method for initializing a memory check for a background memory validation process.

FIG. 3 illustrates one method of initializing a memory check. Memory check initialization occurs when memcheck loadable module 14 is loaded into memory during the processing of the linuxrc command file 12 from the initial RAM disk. Control is received from the insmod command executed in the linuxrc command file at step 30. The memory check module 14 then analyzes the system and establishes global memory check variables for the memory check kernel thread that is started during processing of rc.sysinit command file 18. Generally, the memcheck module 14 calculates the maximum numbers of jiffies that occur before memory check loop issues timer sleep to allow other processes to run at steps 32-36. Specifically, as shown step 32, the clock speed of the CPU is determined. If the CPU clock speed is not greater than or equal to 1000 kHz, then the maximum number of jiffies is set at 2 and the timeout is set at 400 at step 34. If the CPU clock speed is not greater than or equal to 1000 kHz, then the maximum number of jiffies is set at 3 and the timeout is equal to 300 at step 36. At step 38, the page loop count is calculated at step 38. The loop count number identifies the maximum number of pages to be processed during a memcheck cycle.

At step 40, the memcheck module 14 creates the virtual file (proc file) system entries associated with the memory check function. Additionally, the memcheck module 14 also initializes all processing flags. If there is an error in creating the proc file, a fault is raised and the processing on the gaming device is terminated at step 42. At step 44, the memcheck module 14 registers as a character driver in which the character driver's major number is dynamically assigned by the system. Additionally, the memcheck module initializes all the processing flags. If the registration fails, a fault is raised at step 42. Otherwise, a normal return is made to the insmod command at step 46.

Figure 4:
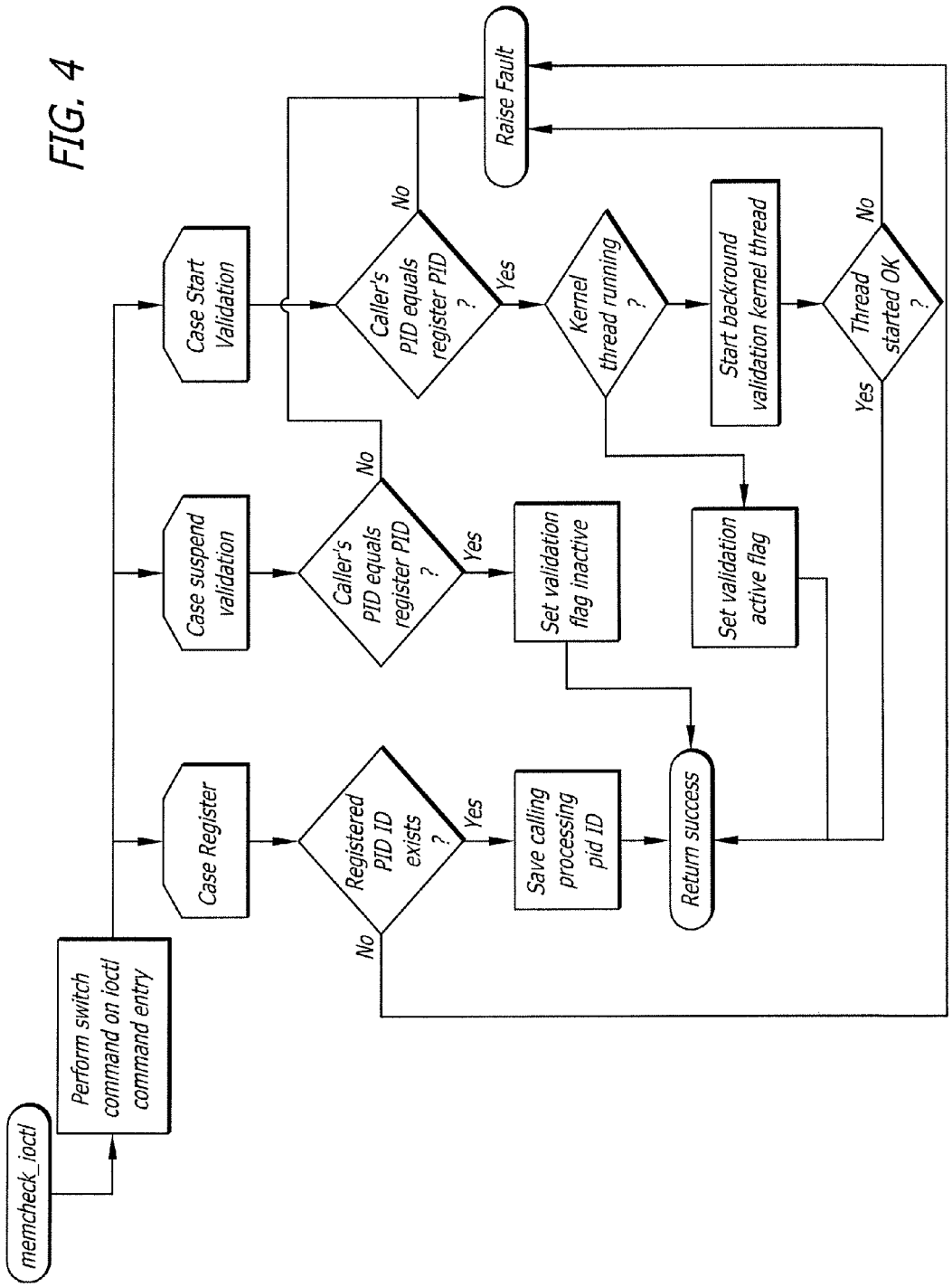
FIG. 4 is a flow diagram of one method for memory check processing for a background memory validation process.

The memory validation IOCTL processing provides the support to (1) register a thread with memory validation support (2) start background memory validation; and (3) stop background memory validation. A logic flow for the IOCTL function is illustrated in FIG. 4. Generally, a command line procedure, init_memcheck.sh, is used to start the background memory validation. The following is one embodiment of the init_memcheck.sh command line procedure.

```
#!/bin/bash
rm -rf /dev/memcheck 2>/dev/null      # Remove any old driver reference
# Get the memcheck's drive major device number
MAJOR=$(grep memchesk /proc/devices|awk '{print($1)}')
# create new node definition in /dev for memcheck
mknod /dev/memcheck c $MAJOR 0
# start background validation processing
validation &
```

This command file creates the correct node identifier within the /dev directory and starts the background validation process. One background validation function includes the steps of opening the memcheck device driver, registering the memcheck device driver with the background validation process, and then issuing an ioctl command to tell the memcheck device driver to start the kernel thread that performs the background memory validation. If any of these steps fail (e.g., memcheck driver is not opened, memcheck driver is not registered, unable to request kernel memory check), a system fault is raised and the gaming device stops processing.

Regarding the memcheck device driver's IOCTL support, the following functions are supported:

Register Memcheck control process: The Register Memcheck control process saves the process ID of calling process. This process is also used to verify whether commands to start or stop the memory validation thread are issued from the same process registered with the memcheck driver. If the commands are issued from different processes, an error is raised. Also, if another process tries to register with the driver once it receives a register request, it raises an error. Any errors in the Register Memcheck control process causes a system fault to be raised.

Memory start validation: Upon receipt of the "Memory start validation" for the first time, the background kernel thread performing the memory validation is started. On subsequent commands received, the Memory start validation command sets a flag referenced by a background kernel thread to indicate that the memory validation is active.

Memory Suspend validation: The Memory Suspend validation function sets a flag in the background kernel thread to indicate that memory validation should be suspended.

Memory trace validation: This function gathers trace information relating to memory validation. The trace information includes, but is not limited to, the total number of pages processed within the system, the number of free pages, the number of pages validated, the number of writable pages, and the number of reserved pages. The data is retrieved from reading the MVM or proc file system. In one embodiment, the trace validation function does not determine whether the requesting process ID is the same as the registered ID. The trace function causes a flag in the kernel thread to be turned on or off, thereby controlling whether trace information should be gathered.

In the event that the validation process cannot open or register with the MVM, the system is faulted. Otherwise, after the validation process registers with the MVM, the validation process issues a command to the MVM to start the background validation kernel thread. The validation process will also periodically request the MVM for its status in order to insure that the background memory validation is still processing.

The memory validation background kernel thread is the main logic trunk for background memory validation support. The background kernel thread loops through all pages in memory. The kernel thread checks if a page is active and whether the page points to a valid VMA. If the page is active and has a valid VMA, VMA flags are checked to determine whether the page is writable. If writable, the page is skipped. Otherwise, a CRC32 hash of the page's contents is created. If the hash is created for the first time, the CRC32 value is stored in all VMAs that reference the page. Otherwise, the calculated CRC32 value is compared to the CRC32 value stored in the referenced VMA. If the values do not match, a system fault is raised and the VMAs pointing to the faulted page are logged. In one embodiment, the system fault is presented on a display of the gaming device. If values are the same, the next page is processed. The number of pages processed within a processing loop is controlled by the number of pages in the system and the CPU speed. When the maximum number of pages is reached or the processing time limit is reached, a timed delay allows other processes in the system to run.

Figure 5:
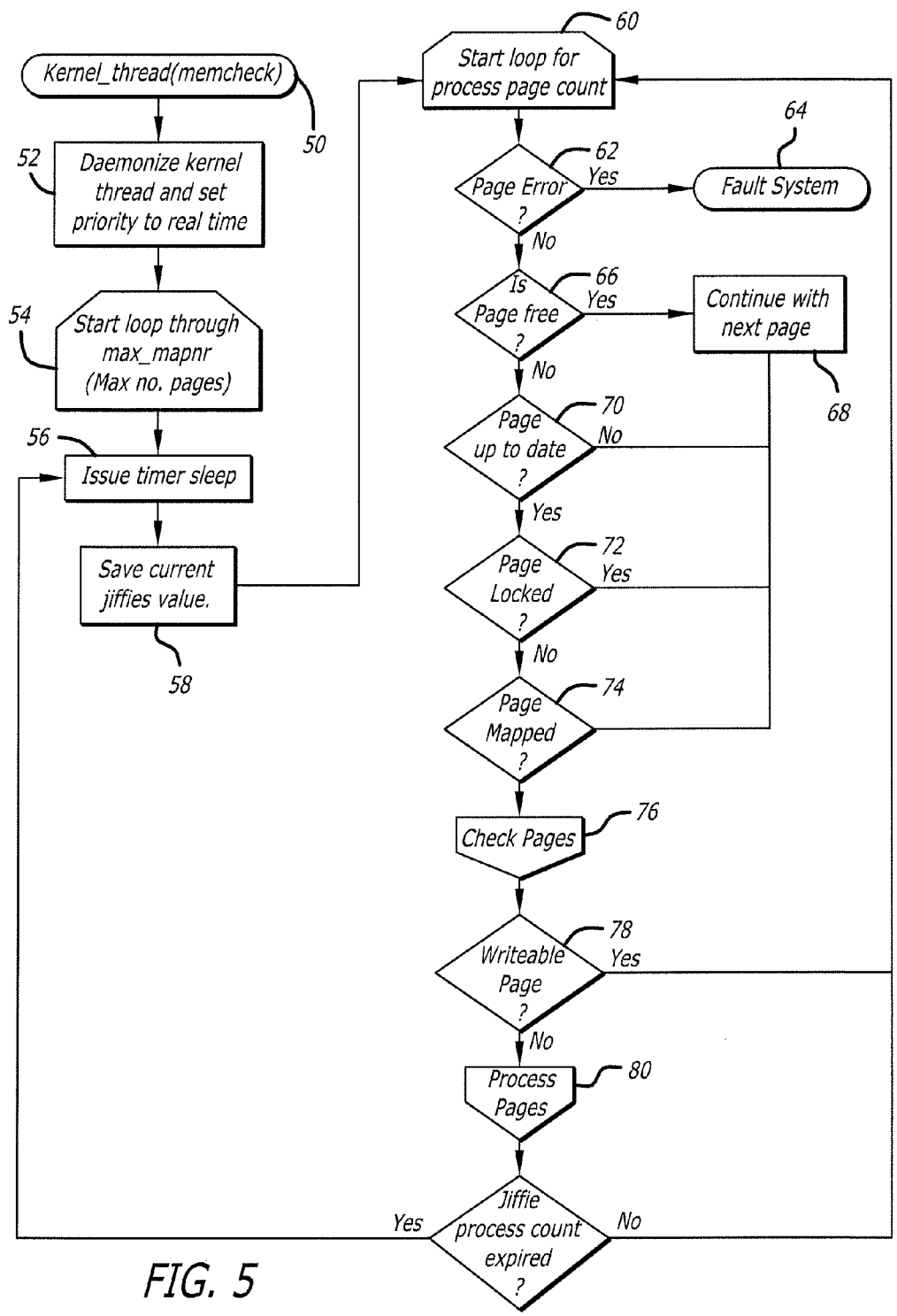
FIG. 5 is a flow diagram of a background memory validation process.

FIG. 5 illustrates another method of background memory validation. The kernel thread is started at step 50. The kernel thread is then daemonized (i.e., run in the background) and the priority is set to real time at step 52. The maximum number of pages that the background kernel will loop through is established at step 54. A timer sleep is also established at step 56, and the current jiffies value (i.e., the duration of one tick of the sleep timer) is saved at step 58. At step 60, the background kernel begins to process pages. At step 62, the kernel thread determines whether there are any page errors. If there is a page error, a system fault is generated at step 64. If there are no page errors, the kernel thread determines whether the page is free at step 66. If the page is free, the process continues onto the next page at step 68. If the page is not free, the kernel thread determines whether the page is up to date at step 70. If the page is not up-to-date, then the process continues with the next page at step 68. If the page is up-to-date, the kernel thread determines whether the page is locked at step 72. If the page is locked, the process continues to the next page at step 68. Otherwise, the kernel thread determines whether the page is mapped at step 74. If the page is mapped, then the kernel thread checks the pages at step 76. Otherwise, the process continues onto the next page at step 68. After the page is checked, the kernel thread determines whether the page is writable at step 78. If the page is not writable, the kernel thread processes the page at step 80. After the page is processed, the kernel determines whether the jiffie process count has expired at step 82. If the jiffie count is expired, the timer sleeper is initiated at step 56. If the jiffie count is not expired, the process loop continues at step 60.

Figure 6:
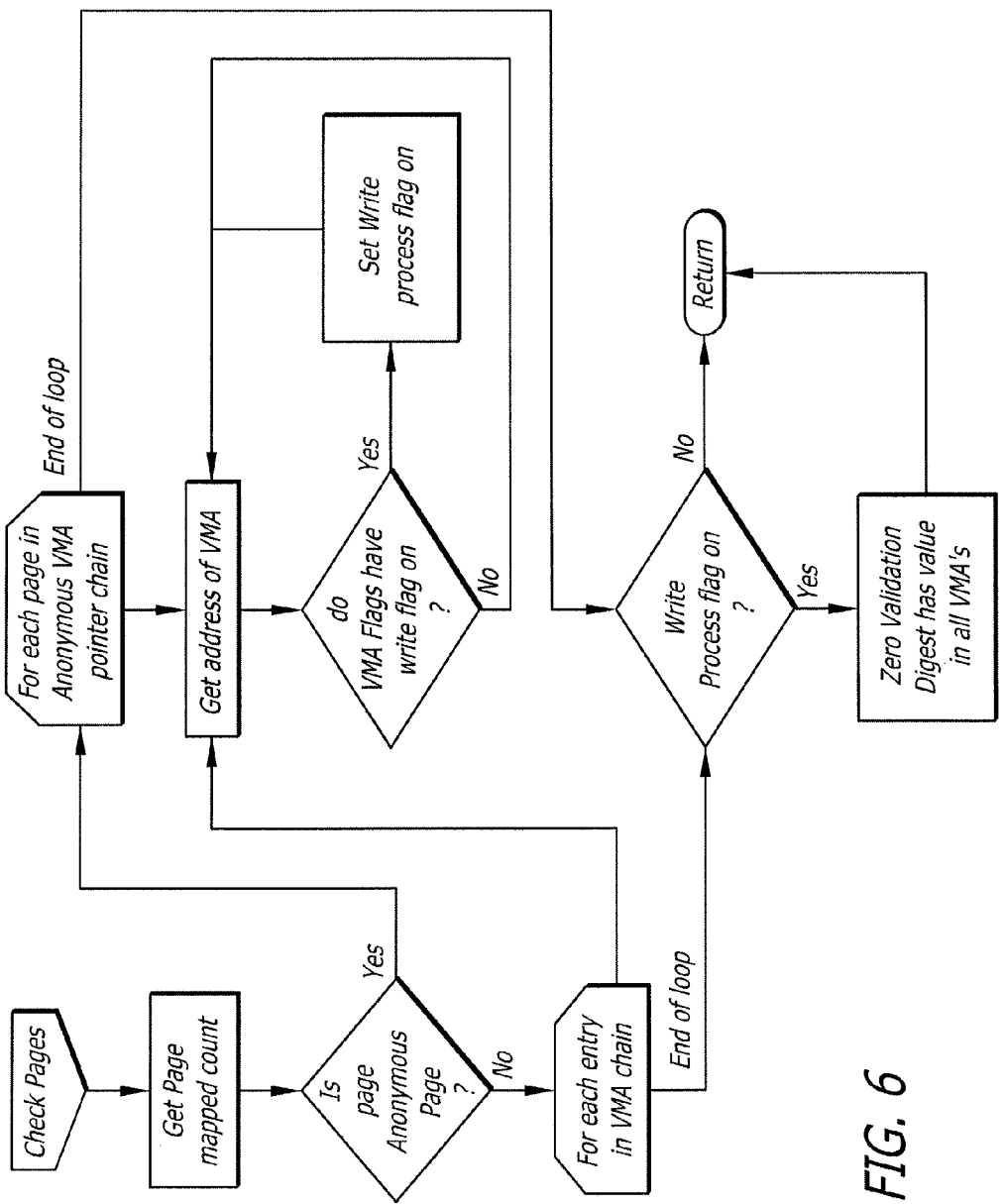
FIG. 6 is another flow diagram of a background memory validation process.

FIG. 6 illustrates another background memory validation thread. This thread determines whether the page is anonymous, checks whether any VMAs associated with the page have the write flag on, and whether the page is writable. If the page is anonymous, VMAs have a write flag on, or if the write process flag is on, the digest value of the page is zeroed out. A page having a zeroed-out digest value is not validated.

Figure 7:
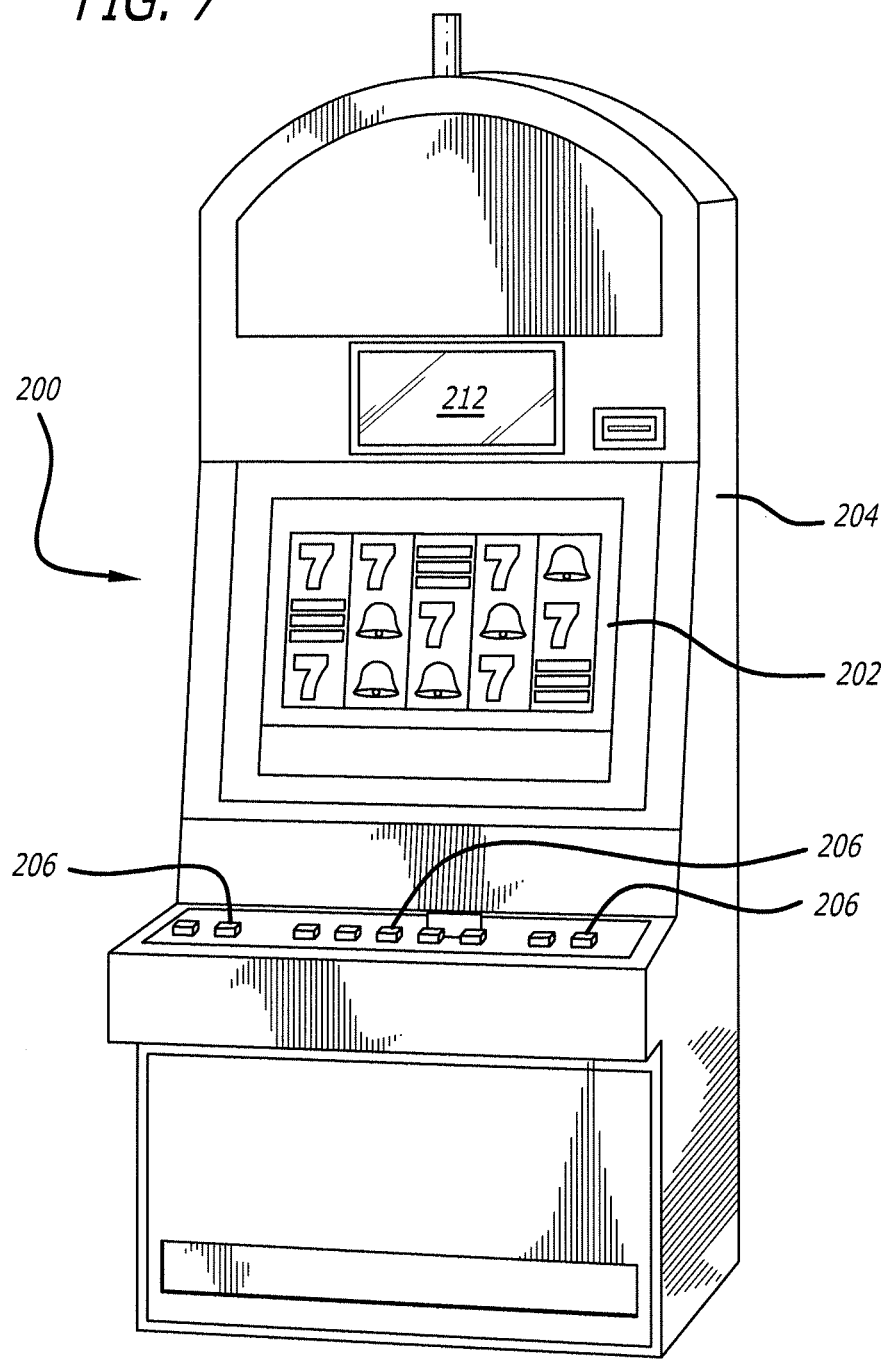
FIG. 7 illustrates one embodiment of a gaming device including the background memory validation system.

FIG. 7 illustrates one embodiment of a gaming device including the background memory validation system. Turning to FIG. 7, the main cabinet 204 of the gaming machine 200 is a self-standing unit that is generally rectangular in shape. In another embodiment, the main cabinet 204 may be a slant-top gaming cabinet. Alternatively, in other embodiments, the gaming cabinet may be any shaped cabinet known or developed in the art that may include a top box. Additionally, the cabinet may be manufactured with reinforced steel or other rigid materials that are resistant to tampering and vandalism. Optionally, in an alternate embodiment, the gaming machine 200 may instead be a cinema-style gaming machine (not shown) having a widescreen display, as disclosed in U.S. application Ser. No. 11/225,827, entitled "Ergonomic Gaming Cabinet," filed on Sep. 12, 2005, which is hereby incorporated by reference.

As shown in FIG. 7, the gaming machine 200 includes a main display 202. According to one embodiment, the main display 202 is a plurality of mechanical reels for presenting a slot-style game. Alternatively, the main display 202 is a video display for presenting one or more games such as, but not limited to, mechanical slots, video slots, video keno, video poker, video blackjack, video roulette, Class II bingo, games of skill, games of chance involving some player skill, or any combination thereof.

According to one embodiment, the main display 202 is a widescreen display (e.g., 16:9 or 16:10 aspect ratio display). In one embodiment, the display 202 is a flat panel display including by way of example only, and not by way of limitation, liquid crystal, plasma, electroluminescent, vacuum fluorescent, field emission, LCOS (liquid crystal on silicon), and SXRD (Silicon Xtal Reflective display), or any other type of panel display known or developed in the art. These flat panel displays may use panel technologies to provide digital quality images including by way of example only, and not by way of limitation, EDTV, HDTV, or DLP (Digital Light Processing).

According to one embodiment, the widescreen display 202 may be mounted in the gaming cabinet 204 in a portrait or landscape orientation. In another embodiment, the game display 202 may also include a touch screen or touch glass system (not shown). The touch screen system allows a player to input choices without using any electromechanical buttons 206. Alternatively, the touch screen system may be a supplement to the electromechanical buttons 206.

The main cabinet 204 of the gaming machine also houses a game management unit (not shown) that includes a CPU, circuitry, and software for receiving signals from the player-activated buttons 206 and a handle (not shown), operating the games, and transmitting signals to the respective game display 206 and speakers (not shown). Additionally, the gaming machine includes an operating system such as Bally Gaming's Alpha OS, as disclosed in U.S. Pat. No. 7,278,068, which is hereby incorporated by reference.

In various embodiments, the game program may be stored in a memory (not shown) comprising a read-only memory (ROM), volatile or non-volatile random access memory (RAM), a hard drive or flash memory device, or any of several alternative types of single or multiple memory devices or structures.

As shown in FIG. 7, the gaming machine 200 includes a plurality of player-activated buttons 206. These buttons 206 may be used for various functions such as, but not limited to, selecting a wager denomination, selecting a number of games to be played, selecting the wager amount per game, initiating a game, or cashing out money from the gaming machine 200. The buttons 206 function as input mechanisms and may include mechanical buttons, electromechanical buttons or touch screen buttons. In another embodiment, one input mechanism is a universal button module that provides a dynamic button system adaptable for use with various games, as disclosed in U.S. application Ser. No. 11/106,212, entitled "Universal Button Module," filed Apr. 14, 2005 and U.S. application Ser. No. 11/223,364, entitled "Universal Button Module," filed Sep. 9, 2005, which are both hereby incorporated by reference. Additionally, other input devices, such as but not limited to, a touch pad, a track ball, a mouse, switches, and toggle switches, are included with the gaming machine to also accept player input. Optionally, a handle (not shown) may be "pulled" by a player to initiate a slots-based game.

One of ordinary skill in the art will appreciate that not all gaming devices will have all these components or may have other components in addition to, or in lieu of, those components mentioned here. Furthermore, while these components are viewed and described separately, various components may be integrated into a single unit in some embodiments.

In some embodiments, the gaming machine 200 is part of a gaming system connected to or with other gaming machines as well as other components such as, but not limited to, a Systems Management Server (SMS) and a loyalty club system (e.g., casino management personnel/system (CMP/CMS)). Typically, the CMS/CMP system performs casino player tracking and collects regular casino floor and player activity data. The gaming system may communicate and/or transfer data between or from the gaming machines 200 and other components (e.g., servers, databases, verification/authentication systems, and/or third party systems).

Figure 8:
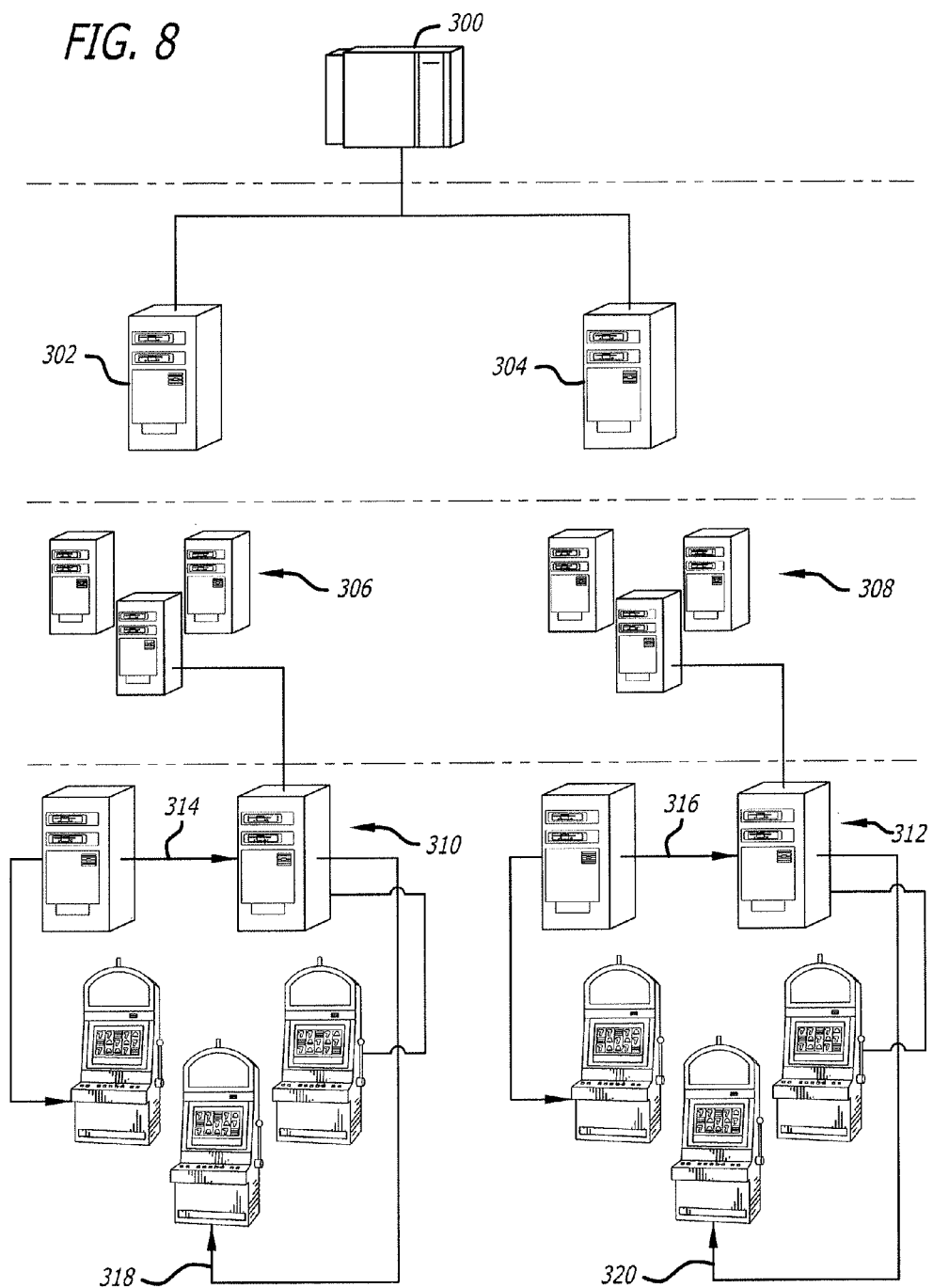
FIG. 8 illustrates one embodiment of a gaming system network including the gaming devices of FIG. 7.

An embodiment of a network that may be used with the gaming device is illustrated in FIG. 8. The example network consists of a top-level vender distribution point 300 that contains all packages for all jurisdictions, one or more jurisdiction distribution points 302 and 304 that contain regulator approved production signed packages used within that jurisdiction or sub-jurisdiction, one or more Software Management Points 306 and 308 to schedule and control the downloading of packages to the gaming machine and a one or more Software Distribution Points 310 and 312 that contain regulator-approved, production-signed packages only used in the gaming establishment that it supports. The Software Distribution Points (SDPs) 310 and 312 can communicate with Systems Management Points (SMPs) 314 and 316, respectively as well as directly to one or more gaming machines 318 and 320. The system allows for rapid and secure distribution of new games, configurations, and OS's from a centralized point. It makes it possible to update and modify existing gaming machines with fixes and updates to programs as well as providing modifications to such files as screen images, video, sound, pay tables and other gaming machine control and support files. It provides complete control of gaming machines from a centralized control and distribution point and can minimize the need and delay of human intervention at the gaming machine. In one embodiment, the configuration control may be from the SDPs 101 or 104 or from the gaming servers 103.

The various embodiments described above are provided by way of illustration only and should not be construed to limit the recited invention. Those skilled in the art will readily recognize various modifications and changes that may be made to the recited invention without following the example embodiments and applications illustrated and described herein, and without departing from the true spirit and scope of the recited invention, which is set forth in the following claims.

What is claimed:

1. A method for verifying contents of one or more pages stored within a memory of a gaming device, the method comprising:
   receiving a command from a memory validation module to start a background validation kernel thread,
   determining whether a page is active and thereafter determining whether the active page is a read-only page;
   starting the background validation kernel thread by determining a duration of a memory check cycle, wherein the duration is based on a maximum number of read-only pages to be processed during the memory check cycle or a maximum number of timer ticks before a sleep timer is initiated, thereby allowing other processes to run; and
   validating the contents of one or more read-only pages stored within a memory of the gaming device with the background validation kernel thread, wherein validating the contents of the read-only pages is a background process.

2. The method of claim 1, wherein validating the contents of one or more read-only pages further comprises determining whether a page is read-only based on one or more fields of a page table entry for the page and a virtual memory address of the page.

3. The method of claim 1, wherein validating the contents of one or more read-only pages further comprises:
   calculating a CRC32 value for the contents of the read-only page; and
   comparing the calculated CRC32 value to a previously-stored CRC32 value for the contents of the read-only page.

4. The method of claim 1, further comprising periodically requesting a status from the memory validation module.

5. A method for verifying contents of one or more pages stored within a memory of a gaming device, the method comprising:
   initiating a memory validation for one or more pages stored within the memory of the gaming device, wherein the memory validation is a background process that uses a background validation kernel thread;
   determining a duration of a memory check cycle using the background validation kernel thread, wherein the duration is based on a maximum number of read-only pages to be processed during the memory check cycle or a maximum number of timer ticks before a sleep timer is initiated, thereby allowing other processes to run;
   determining whether a page is active and determining whether the page is a read-only page;
   configuring a processing loop for the memory validation; and
   validating a page is a read-only page.

6. The method of claim 5, further comprising pausing the processing loop after a predetermined number of pages or after a predetermined time limit.

7. The method of claim 5, further comprising periodically requesting a status from the memory validation.

8. The method of claim 5, wherein configuring the processing loop further comprises determining a maximum number of pages processed based on a total number of pages within the gaming device and a CPU speed of the gaming device.

9. The method of claim 5, wherein determining whether a page is read-only further comprises determining whether the page is active, has a valid virtual memory address, and whether the page is not writable.

10. The method of claim 9, further comprising designating a page table entry for a writable page to be zero.

11. The method of claim 5, wherein validating the read-only page further comprises:
   calculating a CRC32 value for the contents of the read-only page; and
   comparing the calculated CRC32 value to a previously-stored CRC32 value for the contents of the read-only page.

12. A method for verifying contents of one or more pages stored within a memory of a gaming device, the method comprising:
   initiating a memory validation for one or more pages stored within the memory of the gaming device, wherein the memory validation is a background process that uses a background validation kernel thread,
   determining a duration of a memory check cycle using the background validation kernel thread, wherein the duration is based on a maximum number of read-only pages to be processed during the memory check cycle or a maximum number of timer ticks before a sleep timer is initiated, thereby allowing other processes to run;
   determining whether a page is active and determining whether the active page is a read-only page;
   determining whether a page is active by analyzing page table entry and the virtual memory address of the page; and
   validating an active page is a read-only page.

13. The method of claim 12, further comprising configuring a processing loop for the memory validation.

14. The method of claim 13, wherein configuring the processing loop further comprises determining a maximum number of pages processed based on a total number of pages within the gaming device and a CPU speed of the gaming device.

15. The method of claim 13, further comprising pausing the processing loop after a predetermined number of pages or after a predetermined time limit.

16. The method of claim 12, further comprising periodically requesting a status from the memory validation.

17. The method of claim 12, wherein determining whether a page is read-only further comprises determining whether the page is active, has a valid virtual memory address, and whether the page is not writable.

* * * * *